United States Patent [19]

Varga

[11] Patent Number: 5,487,261
[45] Date of Patent: *Jan. 30, 1996

[54] METHOD AND APPARATUS FOR APPLYING FLAT RIBBONS ABOUT A CYLINDRICAL CORE

[75] Inventor: Andre Varga, Willowdale, Canada

[73] Assignee: Ceeco Machinery Manufacturing Ltd., Ontario, Canada

[ * ] Notice: The term of this patent shall not extend beyond the expiration date of Pat. No. 5,331,796.

[21] Appl. No.: 188,087

[22] Filed: Jan. 28, 1994

Related U.S. Application Data

[63] Continuation-in-part of Ser. No. 946,270, Sep. 16, 1992, Pat. No. 5,331,796.

[51] Int. Cl.⁶ .................................................. D01H 13/04
[52] U.S. Cl. ........................ 57/9; 57/11; 57/264; 57/352
[58] Field of Search .................................. 57/6, 9, 10, 11, 57/12, 13, 14, 59, 60, 62, 63, 64, 65, 66.5, 68, 92, 93, 94, 105, 91, 293, 264, 310, 311, 352; 226/29, 44; 242/64, 75; 385/105

[56] References Cited

U.S. PATENT DOCUMENTS

| | | | |
|---|---|---|---|
| 140,934 | 6/1873 | Mayall | 57/213 |
| 146,222 | 1/1874 | Alton | 57/11 |
| 328,171 | 10/1885 | Andrews | 57/235 |
| 601,834 | 4/1898 | Huestis | 57/13 |
| 1,334,086 | 3/1920 | Finkelstein | 57/13 |
| 2,188,847 | 5/1938 | Katz | 57/235 |
| 2,458,243 | 1/1949 | Biddle | 57/229 |
| 3,187,495 | 6/1965 | Christian, Jr. | 57/213 |
| 3,274,846 | 9/1966 | Forster | 57/213 |
| 3,339,012 | 8/1967 | Hutchins, Jr. | 57/213 |
| 3,481,549 | 12/1969 | Cullen et al. | 57/11 |
| 4,129,468 | 12/1978 | Knab . | |
| 4,143,942 | 3/1979 | Anderson | 57/148 |
| 4,156,624 | 10/1979 | de Vecchis et al. . | |
| 4,170,510 | 10/1979 | Brorein et al. . | |
| 4,237,687 | 12/1980 | de Vecchis et al. . | |
| 4,248,035 | 2/1981 | Skillen et al. | 57/213 |

(List continued on next page.)

OTHER PUBLICATIONS

Preliminary Reserach into Ultra High Density and High Count Optical Fiber Cables, International Wire & Cable Symposium Proceedings 1991, pp. 8–23.

Prelimiary Research into High–Count Pre–Connectorized Optical Fiber Cable, International Wire & Cable Symposium Proceedings 1992, pp. 5–11.

Ultra High–Density Optical Fiber Cable with Thin Coated Fibers and Multi-Fiber Connectors, International Wire & Cable Symposium Proceedings 1993, pp. 5–14.

*Primary Examiner*—C. D. Crowder
*Assistant Examiner*—Larry D. Worrell, Jr.
*Attorney, Agent, or Firm*—Lackenbach Siegel Marzullo Aronson & Greenspan

[57] ABSTRACT

Flat filaments or ribbons are deflected by a system of sheaves to converge the filaments to closing stations proximate to points at which the filaments are tangentially applied to helical surfaces of a central cylindrical core member. Successive sets of filament deflection sheaves stack the filaments into bundles or stacks which can be separated by spacer elements which are applied to a smooth core or the filaments can be inserted into helical grooves or slots in the core. Preferably, adjacent filaments forming each stack are guided to prevent contact or totally eliminate sliding friction until just prior to application in the core. The apparatus and method can be used to produce optical fiber cables, high pressure flexible composite pipes and the like in which the flat ribbons can be wound either within helical grooves formed within the core or about the cylindrical surface of a smooth core. Different numbers of filament units can be wound about the core and different numbers of filaments or ribbons can be stacked in one or more of the filament units or bundles. The apparatus and method of the invention are extremely versatile and can produce, for example, both simple and complex fiber optic and other cables including numerous flat fiber optic ribbons or filaments, or flexible composite pipes with multiple layers of helically wound flat strips, in a simple and economical manner.

44 Claims, 7 Drawing Sheets

U.S. PATENT DOCUMENTS

| | | | |
|---|---|---|---|
| 4,332,131 | 6/1982 | Palsky et al. | 57/213 |
| 4,385,485 | 5/1983 | Yonechi | 57/13 |
| 4,388,800 | 6/1983 | Trezeguet et al. | 57/7 |
| 4,395,869 | 5/1983 | Priaroggia et al. | |
| 4,450,676 | 5/1984 | Sakamoto et al. | |
| 4,497,164 | 2/1985 | Dotti et al. | 57/6 |
| 4,576,362 | 3/1986 | Langston | 254/134.3 |
| 4,587,801 | 6/1986 | Missout et al. | 57/6 |
| 4,619,107 | 6/1986 | Missout et al. | 57/6 |
| 4,635,430 | 10/1987 | Missout et al. | 57/6 |
| 4,757,675 | 10/1988 | Oglesby et al. | 57/6 |
| 4,787,702 | 7/1988 | Khalil | 57/63 |
| 4,805,392 | 2/1989 | Seveso et al. | 57/6 |
| 4,825,629 | 5/1989 | Missout et al. | 57/6 |
| 4,833,871 | 5/1989 | Ogawa et al. | 57/6 |
| 4,836,503 | 6/1989 | Giroux | 254/134.3 |
| 4,856,266 | 8/1989 | Ogawa et al. | 57/9 |
| 4,875,661 | 10/1989 | Langston | 254/134.3 |
| 4,949,537 | 8/1990 | Rawlyk et al. | 57/7 |
| 5,029,816 | 7/1991 | Langston | 254/134.3 |
| 5,042,904 | 8/1991 | Story et al. | 385/105 |
| 5,331,796 | 7/1994 | Varga | 57/9 |

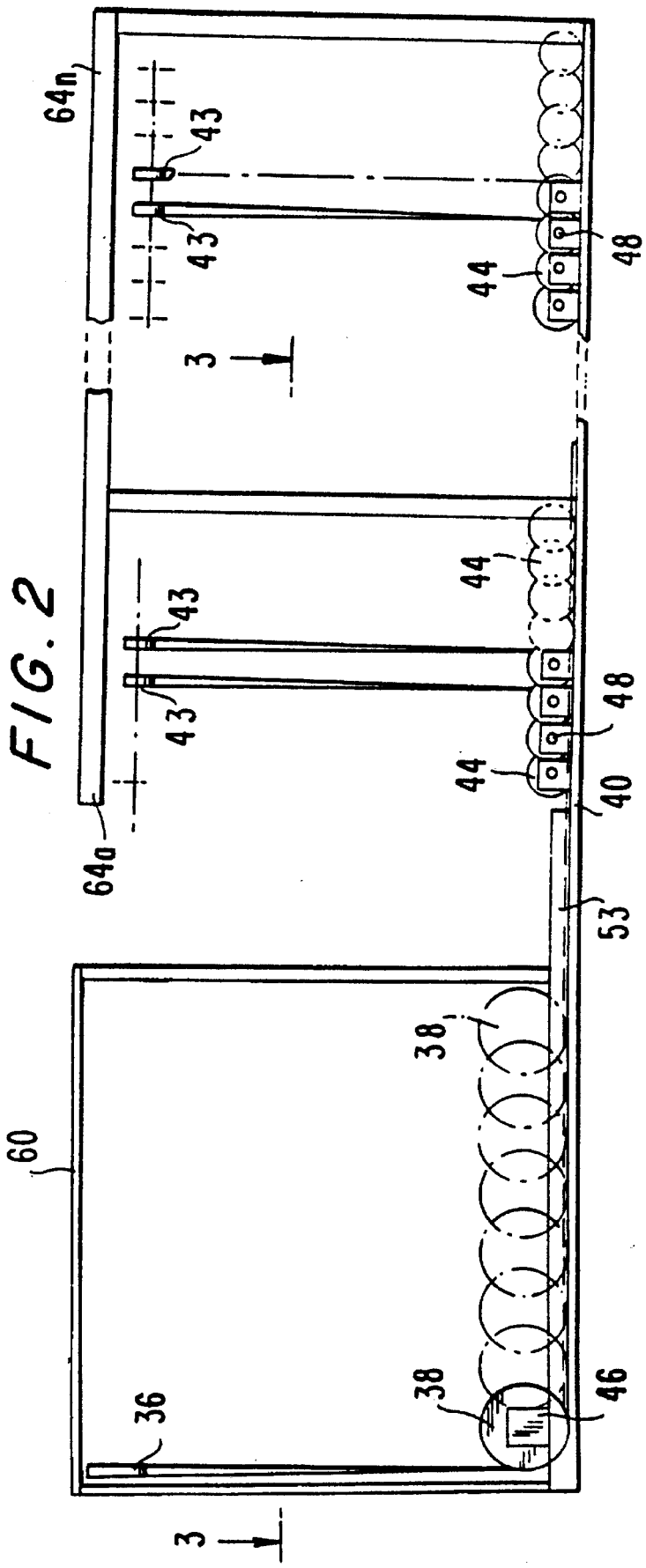

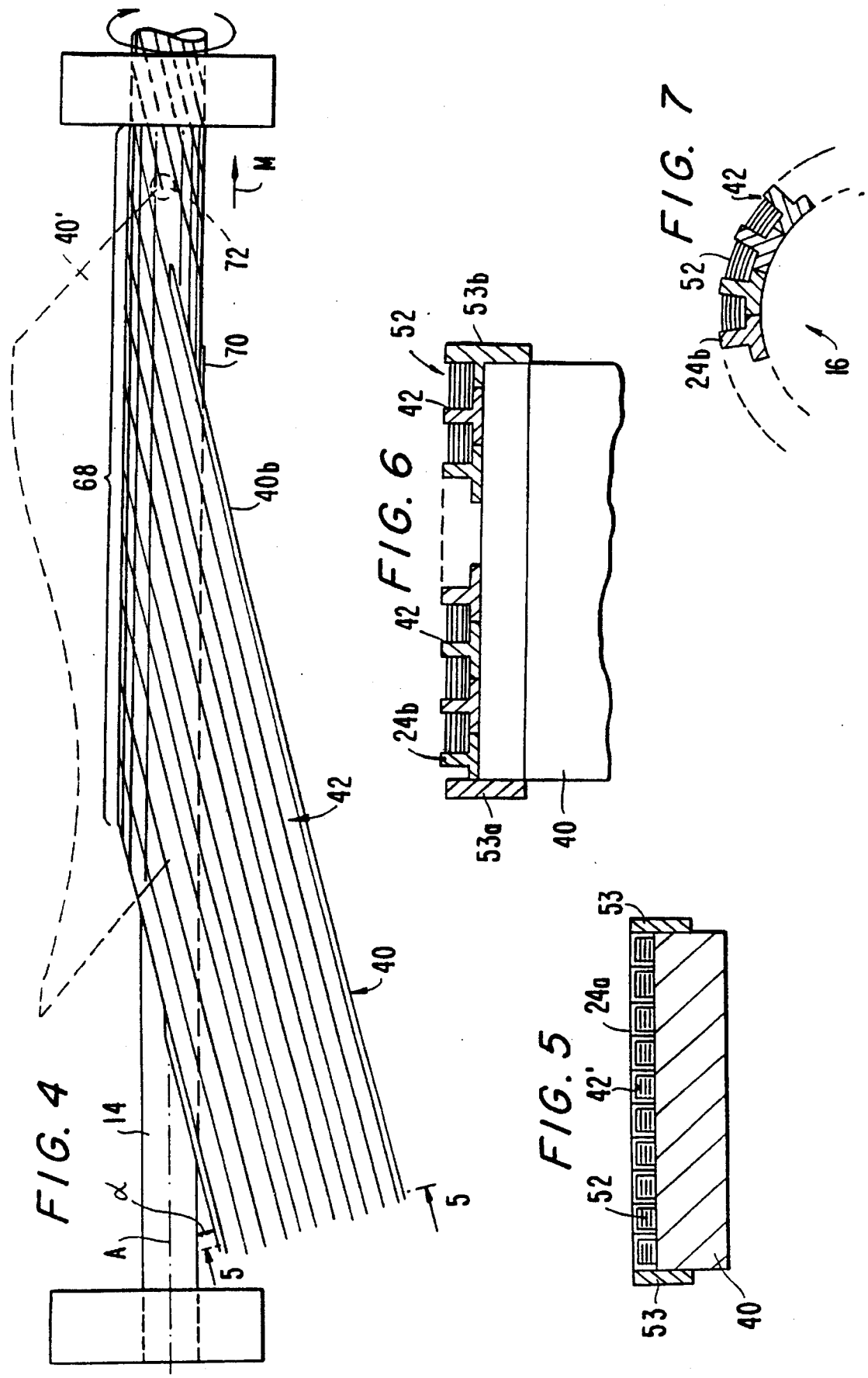

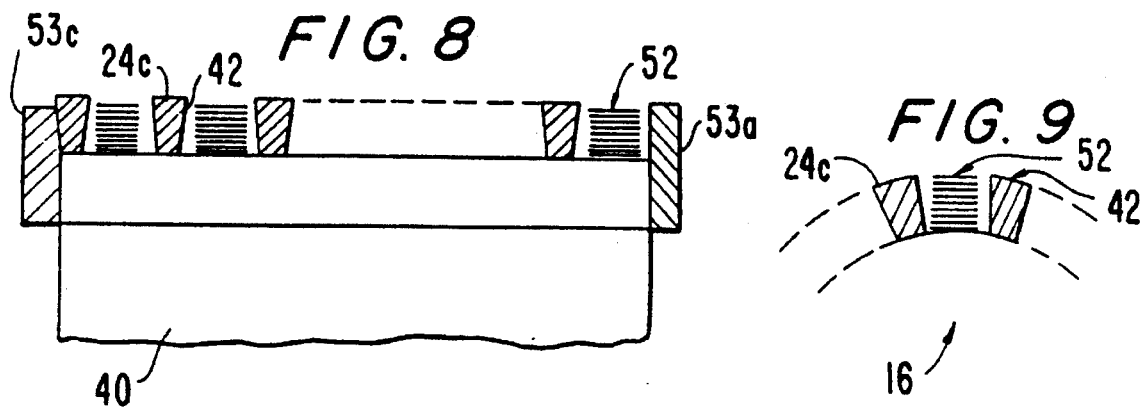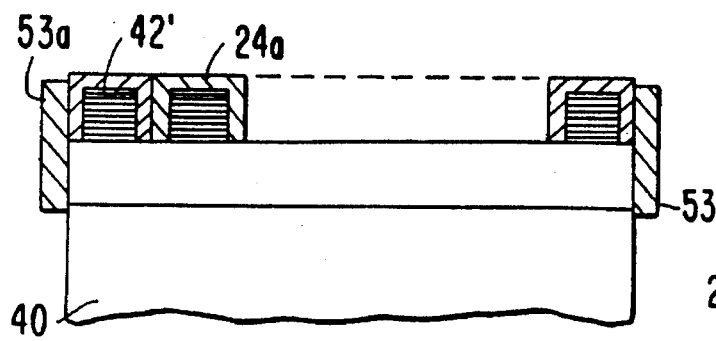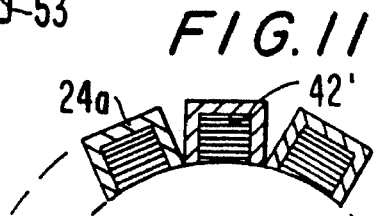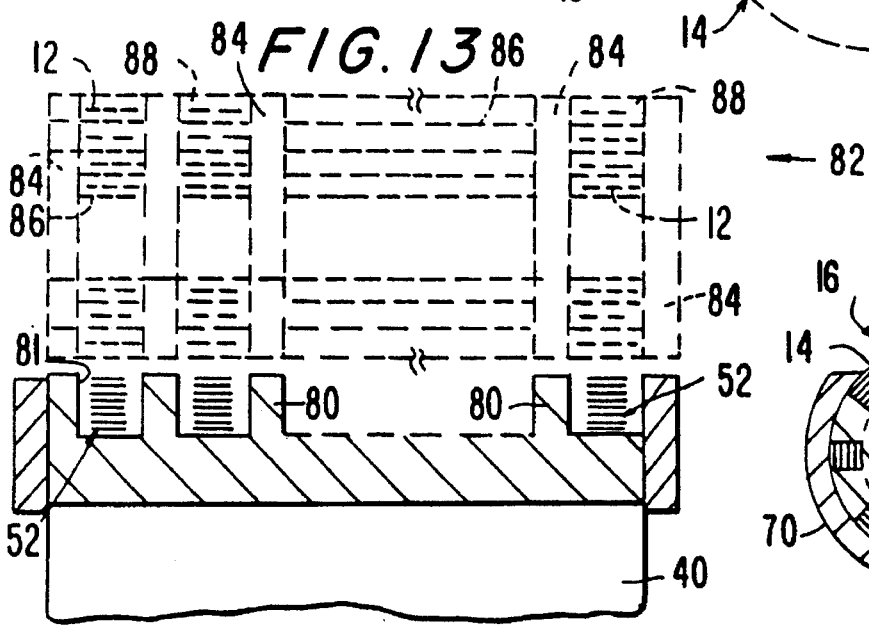

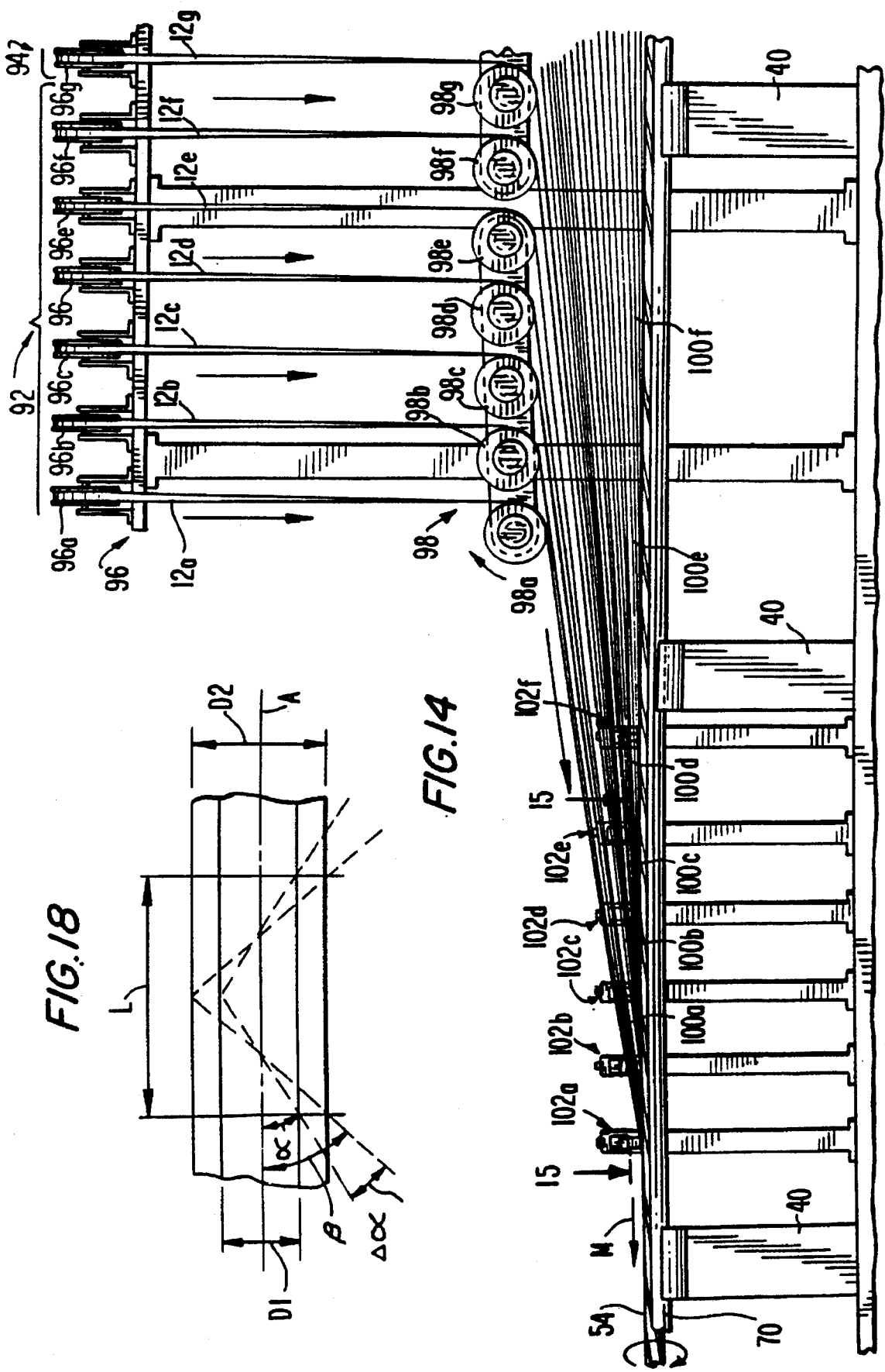

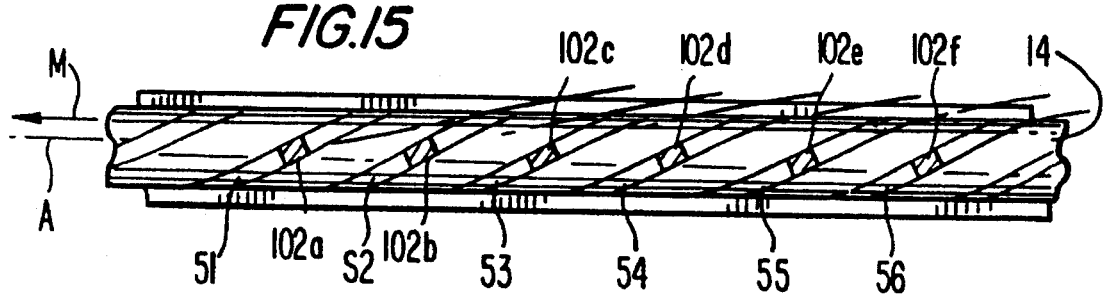
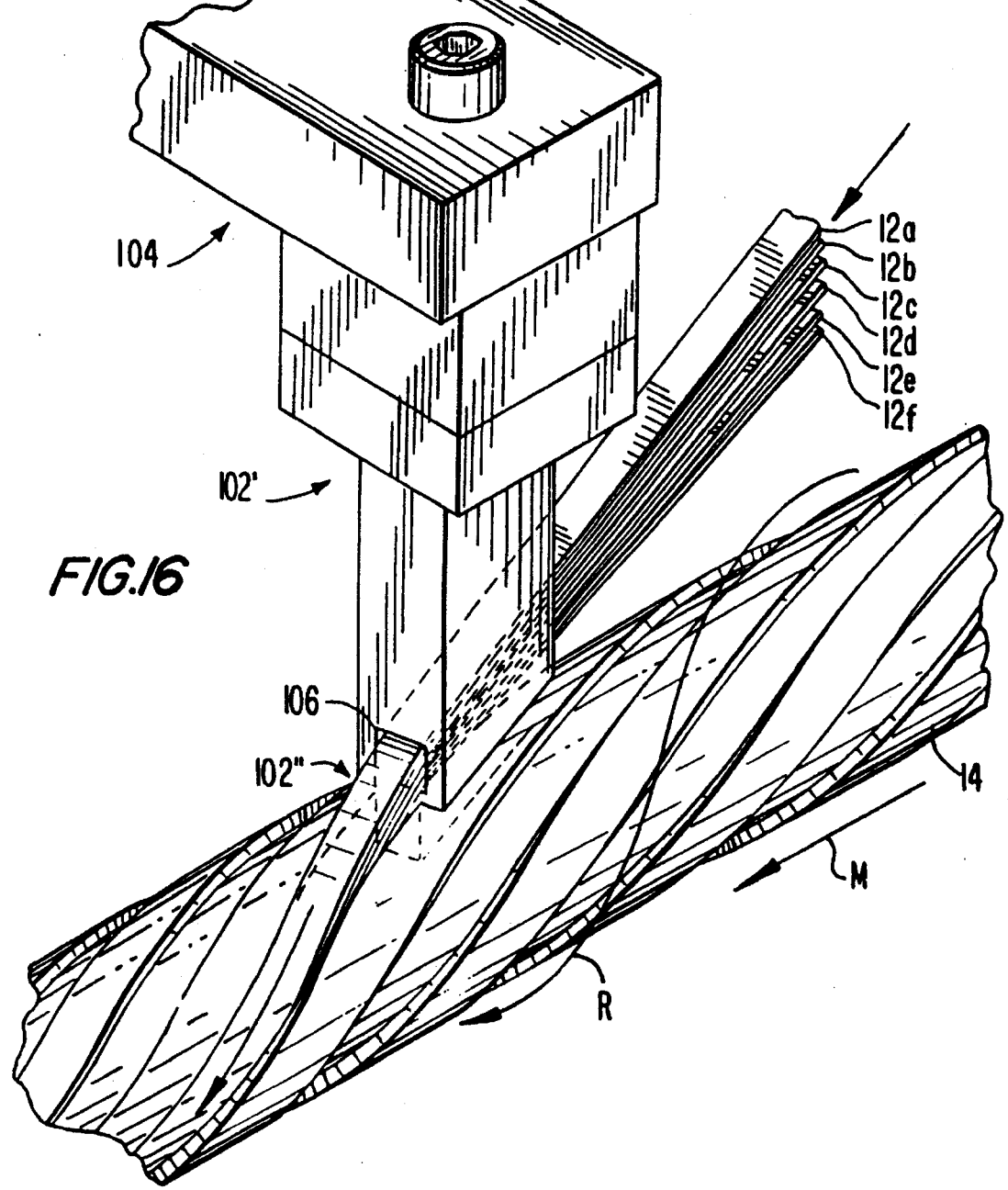

METHOD AND APPARATUS FOR APPLYING FLAT RIBBONS ABOUT A CYLINDRICAL CORE

CROSS REFERENCE TO RELATED APPLICATION

This application is a continuation-in-part application of application Ser. No. 07/946,270 now U.S. Pat. No. 5,331,796 filed Sep. 16, 1992.

BACKGROUND OF THE INVENTION

1. Field of the Invention

The present invention generally relates to a method and apparatus for applying flat ribbons, filaments or strips about a cylindrical core and, in particular, to a method and apparatus for applying bundles of ribbons or strips into helical grooves in a slotted core or on the exterior surface of an elongated cylindrical member.

2. Description of the Prior Art

Devices to insert filaments, especially fiber optic ribbons, into grooves have been used in the past. These devices are broadly divided into two categories.

In the first category of devices, the fibers are loaded on a rotating cage while the slotted core does not rotate. The cage containing the fiber optic bobbins rotates around the slotted core following the slots. Such a system is shown in U.S. Pat. Nos. 4,587,801; 4,619,107 and 4,635,430. In the second category, the slotted core is made to rotate around its own axis while passing through the application point. The fibers in this case are carried by stationary bobbins and are inserted into the slots. Examples of this method are shown in U.S. Pat. Nos. 4,833,871 and 4,388,800.

For fiber optic filaments to be inserted into slotted cores, one usually assembles the fibers in bundles, stacks or packets and, in the last few years, fiber optic bundles have also been embedded in special plastic compounds, laid side-by-side to form a ribbon-like structure.

Fiber optic ribbons have been incorporated into cables in a variety of ways, one of which is to insert several stacked ribbons into slotted cores similar to the ones mentioned in the above prior art. Such ribbons have been known to be wound on cylindrical cores together with spacers that are inserted to create containment means to keep the packets of ribbons in place over the cylindrical support core. "Preliminary Research Into Ultra High Density And High Count Optical Fiber Cable", Tomita et al, International Wire & Cable Symposium Proceedings 1991, pages 8–15; "Design And Qualifications of Gas Pressurized And Water Blocked Slotted Core Ribbon Cables", Nassar et al, International Wire & Cable Symposium Proceedings 1991, pages 16–23. See also, "Preliminary Research Into High-Count Pre-Connectorized Optical Fiber Cable", Tomita et al, International Wire & Cable Symposium Proceedings 1992, pages 5–11, and "Ultra High-Density Optical Fiber Cable With Thin Coated Fibers", Tomita et al, International Wire & Cable Symposium Proceedings 1993, pages 5–14.

The application of ribbons and of packets of stacked ribbons requires specific care because ribbons, contrary to fiber optic bundles or fiber optics in a tube, can obviously be bent only in one direction and cannot be bent sideways. Therefore, the inserting devices that have been used for ribbon and ribbon packets are very complicated because it is very cumbersome to bring all the ribbon elements in a ringed configuration which will allow the insertion of the ribbon or ribbon packets around the circumference of the slotted or cylindrical core.

Furthermore, the application devices have also been complicated by the generally high number of guide pulleys that are required, making it very difficult to control and measure the actual tension with which the ribbons or the packets of ribbons are deposited in the slots or wound on the cylindrical core at the application point. One must bear in mind that when a packet or stack of ribbons are applied or wound onto a cylindrical surface, the speed of each ribbon in the packet increases slightly from the inner ribbon to the outer ribbon and, therefore, it is important that the ribbons in the packet are allowed to slide in relation to each other. In a circumferential insertion machine, this requires that each ribbon in the packet be brought into contact with the adjacent ribbon at the last possible moment, close to the application point. Therefore, the device becomes very cumbersome, particularly when many hundreds of ribbons are brought together to converge at the closing point.

Most of the aforementioned apparatus for assembling or manufacturing fiber optic cables do not take into account that the optical properties of the fiber optic ribbons are very sensitive to any physical stress on the ribbons. However, because the ribbons are exposed to frictional forces as they are guided through the machine, the ribbons are subject to stresses and the tensions that are applied to the ribbons become an important consideration. The problem of frictional forces is aggravated by static charges developed when contacting ribbons or filaments slide one against the other at different speeds.

A number of references have sought to address this problem. In U.S. Pat. No. 4,248,035, an apparatus is disclosed for assembling a fiber optic cable which seeks to avoid destructive tensile and compressive stresses in the fiber optic ribbons when the cable is bent and the grooves in which the fibers are inserted are helical in form. To minimize longitudinal tension in the fibers, air is directed along the surface of the cable in the feed direction. The tubes are sealed at the upstream end, the other tube extending beyond the inner tube by the downstream end. The air jet both frictionally urges fibers in the feed direction and creates a partial vacuum over the fibers to locally reduce contact pressure between the fibers and the central strength filament.

In U.S. Pat. No. 4,450,676, an apparatus is disclosed for stranding optical fiber cores while slackening them. A core delivery system is provided which has a passage for passing the optical fiber cores through it and a gas which flows from the back position of the passage towards the front functions to send out the optical fiber cores at the inlet side of the core storing spaces. The tensile forces on the optical fiber core at the inlet sides are decreased by a winding drum mechanism.

In U.S. Pat. No. 4,805,392, an optical fiber manufacturing apparatus is disclosed which seeks to prevent tensile stresses on the optical fibers. This is achieved by means of an inserting head, a photoelectric optical system between the supply bobbins and the inserting head to provide signals indicating the positions of the optical fibers advancing from the supply bobbins. A control device is connected to the photoelectric system and is responsive to the signals generated therefrom to control the speed at which the optical fibers are paid off from the supply bobbins.

SUMMARY OF THE INVENTION

Accordingly, it is an object of the present invention to provide a method and apparatus for applying stacked flat ribbons, such as optical fiber ribbons, about cylindrical or slotted cores which do not have the disadvantages inherent in prior art methods and apparatus.

It is another object of the present invention to provide an apparatus and method of providing a closing die system for flat ribbons or filament cables which is simple in construction and economical to manufacture.

It is still another object of the present invention to provide a method and apparatus as aforementioned in the previous objects which permits tension control and stretching of individual ribbons or strips in each bundle or stack.

It is yet another object of the present invention to provide a method and apparatus for manufacturing optical fiber cables or flexible pipe with stacks of ribbons or strips helically wound about cores which utilizes a fixed or stationary supply system and a core that rotates about its axis while it is advanced.

It is a further object of the present invention to provide a method and apparatus for manufacturing optical cables or flexible pipe with stacks of ribbons or strips which are helically wound about cable cores with a wide range of separators for separating adjoining stacks or bundles of ribbons or strips when the same are applied to the exterior cylindrical surface of the core.

It is still a further object of the present invention to provide a method and apparatus for manufacturing optical cables or flexible pipe as aforementioned in the previous objects which allows stacks of ribbons or strips to be formed substantially at the point of application about a core to minimize contact and friction between adjacent ribbons or strips within a stack prior to application on the core.

It is yet a further object of the present invention to provide a method and apparatus for manufacturing optical cables of the type generally under discussion which minimizes sliding contact between adjacent ribbons in a stack deposited into helical grooves of a cable core or separators helically deposited on the surface of a cable core, to thereby minimize friction due to sliding contact and static attraction.

It is an additional object of the present invention to provide a method of apparatus of the type suggested in the previous objects which allows ribbons or strips to be helically wound about rotating cores to be deposited on such cores as stacks of ribbons or strips formed at the point at which the ribbons or strips are deposited on the core, or the stacks can be formed at successive winding stations at which individual ribbons or strips of a given layer of the stacks are deposited.

It is yet an additional object of the present invention to provide a method and apparatus for depositing stacks of ribbons or strips on a rotating core which deposits ribbons or strips in a stack at different pitch or lay angles to compensate for the different winding diameters of the ribbons in next successive layers of a stack to thereby maintain the lay of all of the ribbons in the helically wound stacks at a substantially constant preselected value.

It is yet an additional object of the present invention to provide a method and apparatus for helically depositing stacks of ribbons on a rotating core which minimizes stresses throughout the flat ribbons irrespective of where the ribbons are located in the deposited stacks.

In order to achieve the above and other objects, the invention comprises a closing die system to be used in a line of the second category described above, namely a line where the cylindrical core or a slotted core is rotated while the feed path for the flat ribbons or strips is stationary.

In accordance with the broader aspect of the invention, the apparatus helically winding a plurality of flat filaments or ribbons about a cylindrical core comprises first supply means for supplying a rotating central core having a cylindrical surface for longitudinal movement substantially along a machine axis of the apparatus. Second supply means is provided substantially fixed relative to the direction of said machine axis for supplying a plurality of flat filaments to be helically wound about a cylindrical surface of the core. At least one winding station is provided downstream of said first supply means and arranged substantially along said machine axis. Guide means is provided for guiding each of the plurality of filaments along a feed direction that defines an acute angle with said machine axis which substantially corresponds to a desired lay angle of the filaments about the core. Each of said filaments is drawn along said feed direction by the rotating core for substantially tangential application of the filaments about the core at said winding station.

In accordance with the one presently preferred embodiment, support means is provided having a downstream end arranged substantially along said machine axis and an upstream end offset from said machine axis to define an angle between said support means and said machine axis which is substantially equal to the desired lay angle of the filaments about the core for supporting and guiding said filaments between said upstream and downstream ends. Said guide means guides the filaments from said second supply means to said upstream end of said support means and positions the filaments in a predetermined number of adjacent positions along a direction substantially transverse to said support means to form a predetermined number of filament units no greater than the number of helical windings to be applied about the core, said filament units being drawn along said support means by the rotating core for staggered and tangential application of the filament units about the core at said winding station at said downstream end of said support means.

In accordance with one aspect of the invention, said guide means comprises a set of guide members arranged for converging a plurality of filaments into a stacked unit of filaments for substantially tangential application to the cylindrical surface of the central core at a surface application point which defines a radial direction which extends from said machine axis through said application point, said guide members arranging said plurality of filaments in a feed plane which is defined by and contains said feed and radial directions. Said plurality of filaments converges from said guide members to said winding station to cause initial contact between adjacent filaments substantially at the point of application of the filaments on the core to form a stack of filaments. Adjacent filaments forming each stack are angularly offset from each other within said feed plane prior to contact. Insertion means is provided at said point of application for closing the filaments into a stack and applying the same to the rotating core substantially at said application point.

In accordance with another aspect of the invention, said guide means comprises a plurality of sets of guide members, each set being arranged for guiding a plurality of filaments onto a corresponding plurality of helical core surfaces axially spaced from each other along the longitudinal length direction of the core. The helical surfaces of the core associated with each set of guide members define a winding station. Successive sets of guide members apply a like plurality of filaments on previously laid filaments to form stacks of filaments on each helical core surface each of which has a number of filaments which correspond to the number of axially spaced winding stations.

In at least some of the embodiments, said guide means is arranged to substantially prevent contact of incoming flat ribbons or strips until they are laid on the advancing and rotating core.

The present invention also contemplates a method of helically winding a plurality of flat filaments or ribbons about a cylindrical core as above suggested.

Instead of inserting, as in the prior art, all the filaments or ribbons radially at a fixed closing point, the filaments or ribbons are inserted tangentially on helical surfaces of the core, either on a cylindrical surface or in helical slots or grooves at longitudinally or axially staggered points on the core. Such systems allow for much simpler filament paths. In the case of ribbon stacks or packets, the effect of ribbons sliding on adjacent counterparts is minimized or substantially eliminated because, after the last deviation pulley or sheave, the ribbons proceed in a substantially straight line to the staggered application points or converge to the application points.

The system also allows the possibility of controlling the tension which each of the individual ribbons or filaments is applied at the application point by simply controlling the tension at the last deviation pulley. The only difference between the tension measured at the last deviation pulley and at the application point is the friction between adjacent layers or filaments on separators, in connection with one embodiment of the invention, and this is minimal because of the substantially straight path followed by the filaments or ribbons, the absence of pressure on the ribbon packets and the minimal relative speed between ribbons in the same packet. However, with other embodiments of the invention, the ribbons are maintained separated from each other until they are closed into contact against each other just prior to the application point, this substantially eliminating any friction whatsoever.

BRIEF DESCRIPTION OF THE DRAWINGS

The present invention will be explained in detail by reference to the embodiment which is shown in the accompanying drawings.

FIG. 2 is a fragmented front elevational view of the assembling and tension sensing station shown in FIG. 1;

FIG. 3 is a cross-sectional view of the station shown in FIG. 2, taken along line 3—3;

FIG. 4 is a top plan view of the longitudinal application station shown in FIG. 1;

FIG. 5 is a cross-sectional view of the assembly table shown in FIG. 4, taken along line 5—5, and illustrating packets or stacks of fiber optic ribbons being guided along the assembly table and separated from each other by means of separators or spacers;

FIG. 6 is similar to FIG. 5, but showing inverted T-shaped separator elements instead of the inverted U-shaped separator elements of FIG. 5;

FIG. 7 is a schematic partial front elevational view of the wound optical cable using the separator elements shown in FIG. 6;

FIG. 8 is similar to FIG. 6, but showing inverted trapezoidal-shaped separator elements;

FIG. 9 is similar to FIG. 7, but showing the elements illustrated in FIG. 8;

FIG. 10 is similar to FIGS. 6 and 8, but showing the inverted U-shaped elements of the type illustrated in FIG. 5;

FIG. 11 is similar to FIGS. 7 and 9, but showing the elements illustrated in FIG. 10;

FIG. 12 is a cross-sectional view of a cable in accordance with the present invention where the cable core is provided with helical grooves into which the fiber optic packets or stacks are placed, without the use of separator elements;

FIG. 13 is similar to FIG. 6, in which the separators for adjacent packets are integrally formed on the table or guide support member, and also illustrating a frame in the form of a lattice structure provided adjacent to the table or guide support which defines a plurality of openings that serve as positioning dies to maintain desired orientations and positions of ribbons relative to each other;

FIG. 14 is a fragmented side elevational view, in schematic, of a further embodiment of the present invention in which a plurality of guide members are arranged to cause a plurality of flat filaments or ribbons to converge to one of a series of insertion members in which the associated ribbons or filaments first contact each other and are applied to a helical surface of the advancing core;

FIG. 15 is a top plan view of the arrangement shown in FIG. 14, taken along line 15—15;

FIG. 16 is an enlarged and fragmented perspective view of one of the insertion members illustrated in FIG. 14, illustrating a plurality of flat filaments or ribbons converging towards and closed in the insertion member and deposited or laid on a helical grooved surface of the advancing core;

FIG. 18 is a diagram illustrating the relationship between lay angles and the diameters about which flat ribbons are wound to maintain a constant lay length.

DESCRIPTION OF THE PREFERRED EMBODIMENTS

Figure 1:
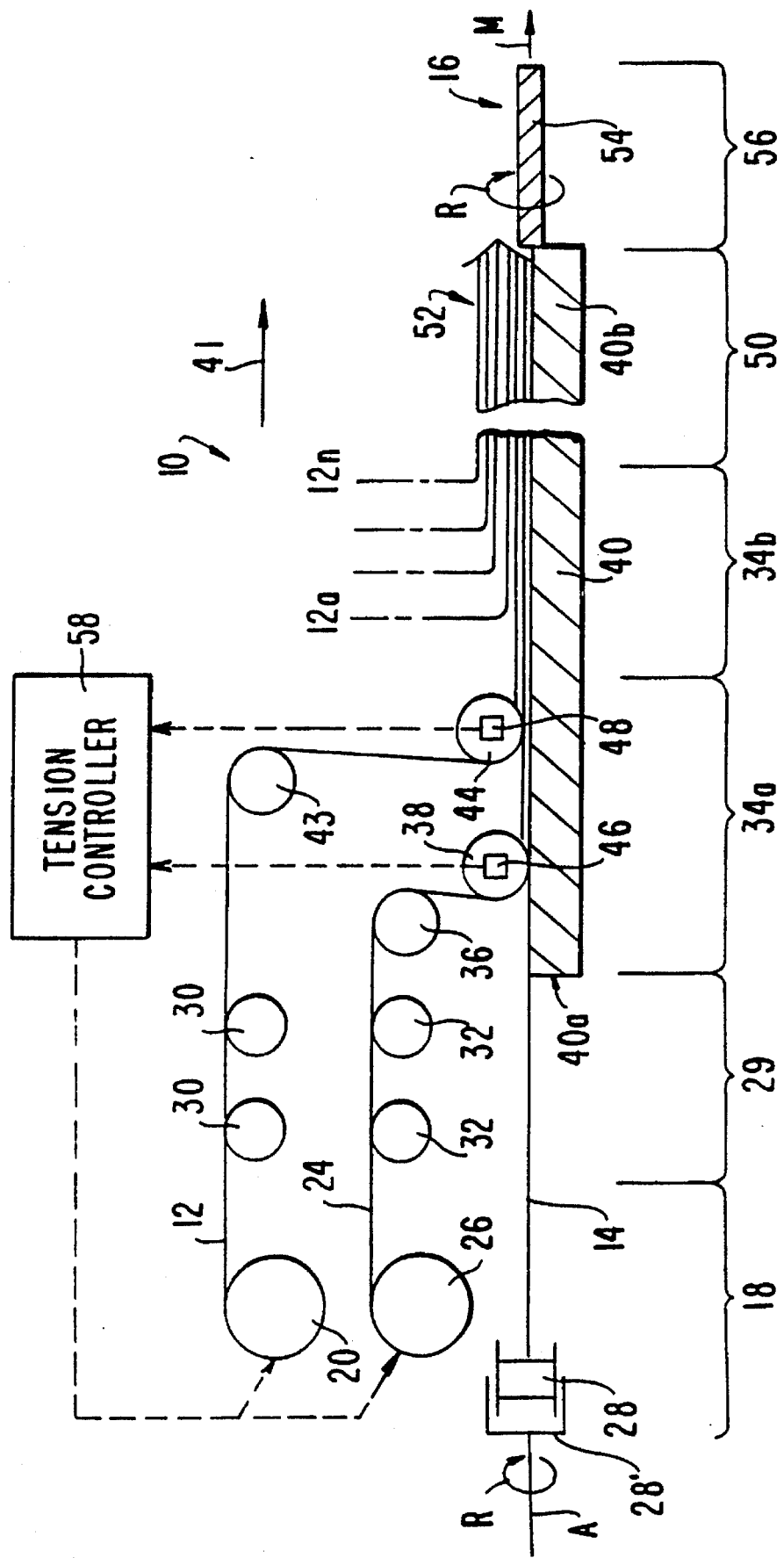
FIG. 1 is a schematic representation of the apparatus in accordance with the present invention illustrating the method for applying stacked optical fiber ribbons about a cylindrical core of a fiber optic cable.

Referring now specifically to the figures, in which identical or similar parts are designated by the same reference numerals throughout, and first referring to FIG. 1, there is shown a schematic representation of the apparatus 10 and method of applying elongate filaments 12 about a cylindrical core of a cable 16. For the purposes of the disclosure, the terms filaments, ribbons, strips and/or strands shall have substantially the same or similar meaning and are used interchangeably, the present invention being primarily concerned with such members or elements that are flat in cross-section. In the specific embodiment to be described, the filaments 12 are optical fiber ribbons or strips and the cable 16 is a fiber optic cable, although it will become evident that the method and apparatus may also be used to manufacture any other cables or pipes on which there are helically wound a plurality of elongate electrical or other ribbons or strips.

The apparatus 10 has a supply section 18 which includes supply bobbins or reels 20 for supplying the generally flat optical fiber filaments, ribbons or strands 12. Any number of spools 20 may be used consistent with the size or nature of the fiber optic cable to be manufactured. Thus, if the cable is required to use a total of 100 optical fiber ribbons, there would be provided 100 spools 20.

The present invention contemplates the fiber optic ribbons 12 to be applied either to the exterior cylindrical surface of a central or supporting core 14 or applied within helical grooves 22 (FIG. 12) cut or otherwise formed in the surface of the supporting core. Where the ribbons are to be helically wound about a cylindrical surface of the core, however, there are advantageously provided, in accordance with a preferred mode of the present invention, separator elements 24 which separate adjacent filaments or stacks or bundles of filaments or ribbons, as will be more fully described. Like the fiber ribbons 12, the separator elements 24 may be issued from spools or reels 26, the number of such reels or spools being determined by the number of separators 24 required for a given cable size and design. Thus, if 10 separators are required for a given cable design 10 reels or bobbins 26 are used.

The supply section 18 also includes a source or supply bobbin or reel 28 which provides the central supporting core 14 which is caused to rotate about the machine axis A of the apparatus 10 in any conventional manner. This may be done, for example, by supporting the reel 28 within a cradle 28' mounted for rotation about the axis A and driven, for example, in a clockwise direction R. The specific design or size of the core is not critical for purposes of the invention, and any conventional core designs may be used for this purpose. For example, the core may be provided with stranded steel or KEVLAR central elements in order to provide increased resistance to stretching and to otherwise stabilize the integrity of the core.

As suggested above, the bobbin or reel 28 supplies the central core 14 which is directed along the machine axis A and is rotated about the machine axis and about its own longitudinal length, in any known or conventional manner. Although only one central core 14 and bobbin 28 are provided, there may be very large numbers of filaments or ribbons 12, bobbins 20, separators 24 and bobbins 26. In the schematic of FIG. 1 it will be understood that the bobbins 20 and 26 are merely representative of the many such bobbins that are actually used. Because of the very large numbers of bobbins 20, 26 that are used it is impractical to station the sometimes hundreds of bobbins proximate to the apparatus 10 and such bobbins must be arranged in banks distributed at different locations both close and remote from the main portion of the apparatus. For this reason the supply section 18 is followed by a guide section 29 which represents guide rollers or sheaves 30,32 which deflect or deviate the directions of the ribbons 12 and the spacers or separators 24, respectively, as required, to guide and converge the same to the assembling and tension-sensing stations 34a and 34b. Station 34a represents a first assembling and tension-sensing section when a plurality of such stations are provided (station 34b) to produce filament units consisting of stacks of more than one filament. When the filament units to be wound about the core 14 consist of only a single ribbon and, as such, ribbons are not stacked, station 34b can be omitted or by-passed.

The station 34a may include a sheave 36 which serves the same or similar function as do the sheaves 32 and which directs the separator 24 toward the final separator sheave 38 for guiding the separator 24 to an upstream end 40a of a suitable support means, such as an elongate assembly table 40, and for dispensing the separator 24 substantially coextensively and along the downstream direction 41 of the table 40 prior to application of the filaments or ribbons 12 on the table. Such initial placement of the separators on the table 40 forms elongate channels 42 (FIGS. 6–9) for receiving the filaments or ribbons 12 similarly introduced by sheaves 43 which serve the same or similar function as do the sheaves 30 and which direct an optical filament or ribbon 12 toward the final filament sheaves 44. Similarly, each final filament sheave 44 deflects an associated filament and dispenses it substantially coextensively and along the downstream direction 41 of the assembly table 40 in a channel 42 formed by adjacent separators 24, when such separators are used with non-grooved cores 14.

As best shown in FIGS. 1 and 4, support means 40 is flat and elongate and has a downstream end 40b arranged substantially along the machine axis A and an upstream end 40a radially spaced from the machine axis A to define an angle $\alpha$ between the table 40 and the machine axis A which corresponds to the desired lay angle of winding of the ribbons 12 about the core 14. While the embodiment being described uses a table 40 as the support means, it will be appreciated that any support components, such as alignment or positioning dies, can be used following the guide section 29, even if some drooping of the filaments occurs.

The sheaves 32, 36 and 38 for the separators 24 and the sheaves 30, 43 and 44 for the ribbons 12 respectively guide and position the associated guided elongate elements to a predetermined number of adjacent positions along a direction transverse to the longitudinal direction of the table 40 (FIG. 3) to form a predetermined number of filament units all simultaneously drawn by the rotating core 14, the number of filament or ribbon units corresponding to the number of helical windings to be wound about the core, such units containing one or more filaments or ribbons depending on whether the helical windings consist of single layer windings or multiple or stacked bundles of ribbons.

In the disclosed embodiment being described 10 filament units or bundles each include a stack of 10 filament or ribbons 12. Therefore, if m is equal to the number of filament units to be wound in 10 grooves 22 or 10 channels 42, m=10. Similarly, if n is equal to the number of filaments or ribbons in each filament unit, n=10. Since FIG. 1 represents the elements needed to produce a single filament unit, 10 such sets of elements must be provided which are offset from each other in substantially parallel planes. Also, since the sheaves 43, 44 account for only one filament or ribbon per unit, a plurality of additional bobbins 20 and sheaves 30, 43 and 44 must be provided (an additional 9 sets in the example) serially arranged along the downstream direction 41 for each ribbon unit, as suggested by ribbons 12a–12n in section 34b, where n=9 in the example.

As best shown in FIGS. 1 and 2, the separators are first deposited on the assembly table 40, and successive layers of ribbons are added to each filament unit by ribbon supply elements 20, 30, 43 and 44. The additional sheaves 43,44 are progressively staggered downstream of the table 40. Once the uppermost ribbon 12n has been deposited on top of each stacked unit each such stacked unit 52 slides along the table, at 50, in a linear manner until each stack unit reaches the downstream end 40b of the table.

It will be clear that once the ribbon units are secured to the core 14 the filament or ribbon units will be drawn along the table 40 by the rotating core for staggered and tangential application of the filament units 52, which are converted into helical windings 54 at the station 56. As indicated, the ribbon units 52 can either be placed into grooves 22 of a core or they can be surface mounted on the core within helical channels 42 formed by adjacent separators 24.

Sensors 46,48 are provided which monitor the tensions in the separators 24 and the ribbons 12 along the feed paths and, preferably, at the respective final sheaves 38,44 at the upstream end 40a of the assembly table at points where the separators and the ribbons are initially positioned or deposited on the table 40. Outputs of the sensors 46,48 can be shown on a control console or can be used as a direct input to a controller 58 which is, in the latter case, responsive to the feedback signals from the sensors to control and maintain the tensions in the filaments or ribbons 12 and the separators 24 at the upstream end 40a of the assembly table at desired levels. Since the separators are not as sensitive to distortions or stretching as are the ribbons it is not always essential that the sensors 46 be provided. However, in the preferred embodiment sensors 46 for the separators are provided to relieve the stresses therein thereby stabilizing the finished cable to minimize possible adverse effects on the finished cable and on the ribbons.

Referring to FIGS. 2 and 3, the assembling section 34a is shown to include a frame 60 which supports the separator guide or deflection sheaves 36 and the final sheaves 38 which are coupled with the sensors 46 for monitoring the tensions in the separators 24. It will be noted that when separators 24 are used (ribbons are mounted on the cylindrical surface of a core) all the separators sheaves 36,38 are housed within the same cage or frame 60 since all the separators 24 are normally simultaneously deposited on the assembly table 40 before the ribbons 12 are deposited, the separators being deposited in parallel relation to each other and to the longitudinal direction of the table 40, as suggested in FIGS. 4,6 and 8. This creates the longitudinal receiving channels 42 for the stacks or bundles 52 of the ribbons 12. The first cage or frame 64a also forms part of the assembly station 34a, which for the filaments 12 includes the sheaves 43,44 for each of the ribbons 12 deposited in one of the receiving channels 42 and represents one (lowermost) layer of the ribbons in each resulting stack or bundle 52. In the example, therefore, the cage or frame 60 includes 10 sets of sheaves 36,38 to provide 10 parallel channels 42, one of which may be defined between a separator 24 and a retainer 53 as shown in FIGS. 6 and 8. As will be noted from FIGS. 6, 8 and 10, the retainers 53a may consist of simply flat plates for abutting against and retaining a vertical surface of an end separator 24a (FIG. 10) or an end stack or bundle 52 (FIG. 8). However, a retainer 53b may be provided (FIG. 6) which compliments an adjoining retainer so as to provide a suitable channel 42 for a stack or bundle 52. In FIG. 8, a modified retainer 53c is shown which has an inclined abutting surface which contacts a separator 24c to maintain the separator in a generally vertical direction as viewed in the figure. The first cage or frame 64a is included in assembling stations 34a and includes 10 sets of sheaves 43,44 for depositing the first or lowermost layers of the ribbons 12 forming the bundles or stacks 52 in each of the channels 42. The next successive cage 64b likewise includes 10 sets of sheaves 43,44 for depositing the next successive layer of ribbons in each of the 10 channels. Cage 64n represents the last of the 10 sets of sheaves 43,44 for depositing the final or uppermost ribbons on each bundle or stack, n being equal to 10 in the example. If m is equal to the number of channels or filament or ribbon units deposited across the assembly table m=10 in the example.

Referring to FIG. 3 the final separator sheaves 38–38i are shown offset from each other along a direction transverse to the longitudinal direction of the table 40 so that such sheave define unique position staggered along that transverse direction, thereby allowing the sheave 38 to deposit their respective separators at desired positions to form the desired channels. Similarly, the final ribbon or filament sheaves 44–44i are offset from each other or staggered to align each such sheave with an open channel 42 into which a ribbon or filament can be dropped or deposited. The final sheaves 44–44i in each of the successive cages or frames 66a–66n are similarly offset so that the ribbons in each of the succeeding layers are likewise aligned with the respective open channels 42 into which they are received.

It should be clear that the arrangement shown in FIGS. 2 and 3 cannot be used for closed channels 42' of the type shown in FIGS. 5,10 and 11 formed by inverted U-shaped separators 24a. Here, the filament or ribbon stacks 52 must be formed first and subsequently covered by the separators 24a. This requires that the positions of the cage 60 and cages 64a–64n be reversed, with the cage 60 being placed downstream of all of the cages 64a–64n.

Referring to FIG. 4, the stacks or bundles 52 of ribbons together with their associated separators proceed linearly, at 50 (FIG. 1), to the winding section 56 where the filament bundles, stacks or units together with the separators engage the rotating core 14 at the staggered application point 68. Although not essential, an optional core support member 70 (FIG. 4) is provided which is coextensive with the table 40 along the application point 68 and positioned to be in abutment with at least a portion of the core on the same side of the table relative to the machine axis. It will be appreciated that such a core support member 70 prevents the core from bulging away from the axis A against the actions of the transverse forces, normal to the axis, which would otherwise causing it to deflect or move off the machine axis, adversely affecting the application of winding of the fiber optic units onto the core. Clearly, the more units or filaments that are wound or the less stiff or rigid the core the more it is recommended that a core support member 70 be used. However, the specific nature or design of the core support member 70 is not critical and any configuration for a given setup may be used.

Referring to FIG. 4, the table 40 is shown in fantom outline (at 40') on the opposite side of the machine axis A. This position can be assumed if the sense of the lay angle is to be reversed. For this purpose the table 40 is advantageously mounted for movement about pivot 72 to that the lay angles α can be adjusted and reversed.

Three examples of possible optical cables 16, based on a cylindrical core, easily achievable with the present apparatus and method are illustrated in FIGS. 6–11. It should be evident that numerous other cable constructions can be obtained, including multiple co-axial layers of individual or stacks or bundles of fiber optic ribbons or filaments. Referring to FIG. 12, the apparatus can also manufacture cables based on slotted cores where the slotted core is either unwound from a rotating payoff-reel or extruded in-line with a slotted die through which a rotating tension resistant member is pulled through.

As will be appreciated when the ribbons are inserted into slotted cores, the separators of the type shown in FIGS. 6–11 can be eliminated since each stack or bundle of ribbons is nested within and held in place by the side walls of the respective grooves or slots into which the ribbons are received. However, the elimination of the separators may require additional steps to be taken to maintain the integrity of the bundles while they move along the table 40 prior to insertion into designated grooves or slots. Such measures may include the use of longitudinal ribs which extend along the table 40 and which are spaced comparably to the ribs 24a–24c to effectively create equivalent channels for maintaining the orientations and positions of the ribbons. Alternatively, one or more positioning dies may be used along or in place of the table 40 for orienting and positioning the ribbons in each bundle or stack in the desired positions relative to each other. At the application point, insertion tools may be used for depositing each stack of pre-arranged and pre-oriented ribbons to force the ribbons upon being deposited to have the proper orientations upon insertion, at which time the ribbons become constrained by the groove walls.

It should also be evident that the apparatus and method described allows a much simpler filament path and also allows, in the case of ribbon packets, stacks or bundles, the possibility of each ribbon sliding on adjacent counterparts very easily since, after the final sheaves 44 the ribbons proceed in a substantially straight path to the staggered application point with minimal friction between adjacent ribbons and small relative movement between elements to be wound. Any meaningful friction applied prior to the final sheaves 44 having been compensated for by the sensors 48 and controller 58.

By easily and efficiently allowing the formation of packets, stacks or bundles of optical ribbons the apparatus and method described above makes it possible and readily manageable to handle large numbers of optical fiber ribbons and manufacture large optical cables which can include hundreds of ribbons. While the assembly table has been shown as being a smooth, flat table, the table can assume other shapes. Thus, the table can be curved or profiled at its supporting surface, the only requirement being that the table provide as low friction on the filaments or ribbons and that the upstream end of the table 40b be positioned at the application point 68 to provide staggered and tangential application of the filament units (and separators) about the core at the winding station as described. Also, the sensors for both the filaments as well as the separators have been described as being coupled to the final sheaves 46,48. This provides for optimum compensational control of the filaments and separators prior to deposition thereof onto the assembly table 40. However, it should be evident that the sensors can be coupled with any of the other sheaves in the line upstream of the final sheaves, with different degrees of advantage. Also, as indicated, the cage 60 for the separators and the cages 64a–64n can be reversed to provide for insertion of the stacked filaments or ribbons within open or closed channels. Clearly, the number of sheaves provided in each of these cages can be modified as necessary to assemble a cable of any size or design.

For ease of threading, support means can be used without the continuous support of a table or other flat surface, as indicated, by using guides for the filaments and the separators to guide these elements to the inserting longitudinal die at the winding or application station 56.

In FIG. 13, the support guide table or stand 40 is shown to include integrally formed longitudinal ribs 80 which extend along the support table and are spaced from each other to create channels 81 to maintain the integrity of the formed stacks of flat ribbons or filaments 52. However, in order to assure that the flat ribbons or filaments are maintained properly positioned and oriented at the application point, there is advantageously provided a lattice frame 82 (or other functionally equivalent structure) formed of spaced vertical members 84 and horizontal separators 86 as shown to form or define channels or openings 88 dimensioned to receive individual filaments or ribbons 12 as shown. By using this arrangement, the filaments in each group of filaments forming a filament unit or stack are maintained in desired positions and orientations relative to each other. The frame 82 is advantageously positioned along the longitudinal length of the support table 40 in an area proximate to the application point or the winding station at which the filaments are applied to the core.

In FIGS. 14–16, an alternate embodiment 90 of the apparatus is illustrated which differs primarily from the embodiment shown in FIGS. 1–13 in that the ribbons are maintained separated or out of contact with each other until they reach the point of application or the winding station or stations. As such, the ribbons are not laid on each other and advanced along a support table as suggested in FIG. 1.

FIG. 14 is a fragmentary view of the apparatus 90 and only shows one full set of guide members 92 and part of a second set of guide numbers 94, it being understood that the apparatus can include any suitable number of sets of guide members required by a specific application. While the first set of guide members includes a plurality of upper deflection pulleys or sheaves 96a–96f, and the second set of guide members only shows the first upper pulley or sheave 96g, each set of guide members in this embodiment will have the same number of deflection pulleys or sheaves 96 (six in FIG. 14). For each upper deflection pulley or sheave 96, there is provided a lower deflection sheave or pulley 98 arranged as shown. Thus, the first set of guide members 92 also includes lower pulleys or sheaves 98a–98f, while the second set of guide members 94 again only shows one of the six lower deflection sheaves or pulleys 98g. Each pair of upper and lower deflection pulleys or sheaves is arranged to guide an associated flat ribbon or filament 12a–12g, it again being understood that only a portion of the flat filaments or ribbons are illustrated and that additional such ribbons or filaments are processed in that portion of the machine which is not illustrated in FIG. 14.

Each set of guide members 92, 94 and the like are arranged for converging a plurality of filaments into a stacked unit of filaments for substantially tangential application of the filaments to the cylindrical surface of the central core 14 at a surface application point which defines a radial direction which extends from the machine axis A through the surface location where the ribbons are applied to the core.

The pulleys 96, 98 of each set of guide members arrange a plurality of filaments in a feed plane which is defined by and contains the feed and radial directions. An important feature of this embodiment is that a plurality of filaments converge from the guide members to the individual winding stations to cause initial contact between adjacent filaments substantially at the point of application of the filaments on the core to form a stack of filaments. Thus, in FIG. 14, the filaments 12a–12e guided by the first set of guide members 92 is arranged into a first plurality of ribbons 100a. The second set of guide members 94 forms a second plurality of ribbons 100b. Additional sets of guide members (not shown) form additional plurality of ribbons 100c–100f. As will be clear from FIG. 14 and 16, the adjacent filaments forming each stack or plurality are angularly offset from each other within the feed plane prior to contact. Insertion or closing members or tools 102a–102f are spaced from each other along the machine axis as shown in FIG. 14, each of the insertion members or tools defining a winding or application station at which an associated plurality of ribbons is applied to the core 14. Therefore, each of the insertion members or tools 102a–102e closes a plurality of converging filaments into a stack and apply the same to the rotating core substantially at the application point. This approach avoids sliding contact between adjacent ribbons which can, in some instances, provide problems due to sliding friction and the formation of static electricity which aggravates sliding friction.

As best shown in FIG. 16, the angular offsets between adjacent filaments forming a related stack or plurality of filaments are substantially equal, the specific angular offset being a function of the number of total ribbons being processed as well as the number of ribbons within a given stack or grouping.

In the embodiment 90 being described, a set of guide members and insertion tools 102e–102f are provided along the axis A for each winding station for application of a stack of filaments at one of a plurality of successive application points along the core. As suggested above, while only six application or winding stations are shown in FIG. 14, a greater or lesser number may be used to accommodate an equal number of grooves or helical stacks or bundles of ribbons that are to be applied about a core surface.

In the arrangement shown in FIG. 14 all of the feed planes are substantially parallel to each other so that all the application points are essentially aligned along a line parallel to the machine axis A as shown in FIG. 15. However, it should be clear that the positions of the feed planes for each individual application station may be different and be circumferentially offset from each other about the surface of the core. However, in the preferred embodiment, all of the feed planes are parallel to each other and the insertion or closing members or tools are aligned in a common feed plane extending through the machine axis A.

The specific construction of the insertion or closing members or tools 102 is not critical for purposes of the present invention. Referring to FIG. 16, one example of such a tool is illustrated which includes an upper portion 102' attached in any appropriate manner to a fixed support 104 and a lower portion 102" which is receivable within an associated groove or slot. An opening 106 is provided between the upper and lower portions 102', 102" for receiving and closing a plurality of filaments to be laid into the groove to bring the filaments into contact with each other just prior to being placed into the groove. Advantageously, the opening 106 is arranged radially proximate to the cylindrical surface of the core to thereby allow adjacent filaments forming a stack to contact only just prior to being placed into a groove.

The grooves or slots are shown to have a predetermined width which is substantially equal to the width of the flat filaments or ribbons. The lower portions 102" of the insertion tools or members have a width substantially equal to the width of the slots so as to be received within the grooves with little clearance. In this manner, consistent placement of the stack of filaments essentially within the centers of the grooves or slots is assured.

While the arrangement of FIGS. 14–16 is shown and described in connection with slotted cores, it will be appreciated that a similar arrangement can be used in conjunction with cores having smooth cylindrical outer surfaces on which there are first applied channels or separators as suggested in FIGS. 7 and 9 or U-shaped channels of the type shown in FIG. 11 but inverted 180° so that the openings of the channels face radially outwardly (as disclosed in the Tomita et al and Nassar et al publications identified in the Background Of The Invention).

Figure 17:
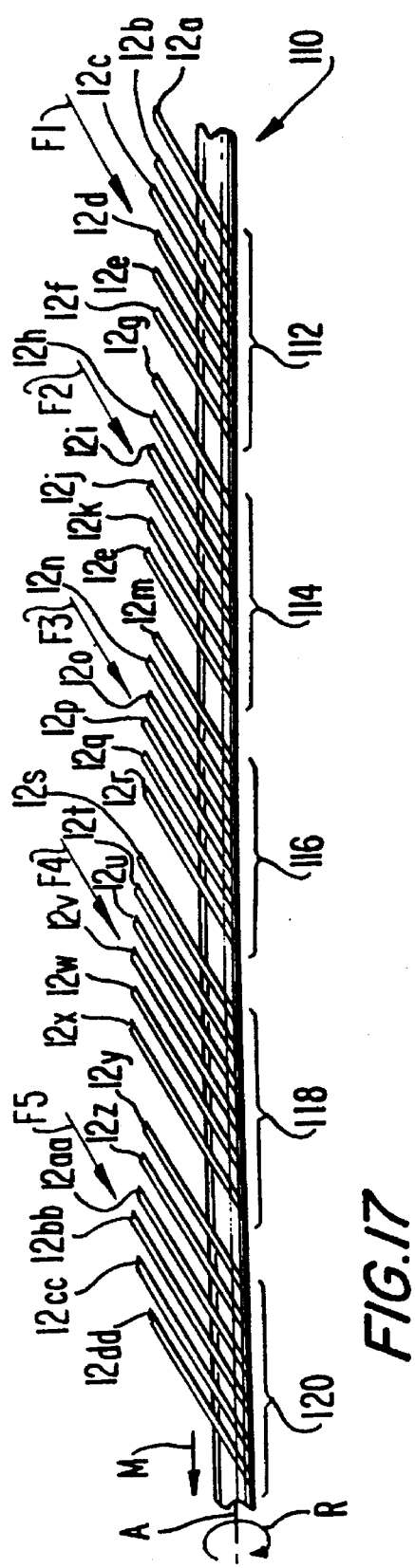
FIG. 17 is a top plan view of a still further embodiment in accordance with the present invention, showing five winding stations, at each of which a plurality of flat ribbons or filaments are helically applied on an advancing core.

Referring to FIG. 17, a still further embodiment 110 of the invention is illustrated in which the guide members comprises a plurality of sets of guide members (not shown in the figures) which are similar to the sets of guide members 92, 94, etc. of the type discussed in connection with the embodiment 90. Each set of guide members are arranged for guiding a plurality of filaments onto a corresponding plurality of helical core surfaces axially spaced from each other along the longitudinal length or direction of the core. The helical surfaces on the core associated with each set of guide members define a winding station 112, 114, 116, 118 and 120. Successive sets of guide members apply a plurality of filaments on previously laid filaments to thereby form a stack of filaments on each helical core surface which has a number of filaments in each stack which corresponds to the number of axially spaced winding stations. Thus, six flat filaments or ribbons 12a–12f are initially applied at the first winding station 112. The lower-most ribbons or filaments in the stack are applied at the first winding station 112. With rotation R and linear movement M of the core 14 as shown, it will be appreciated that the initial filaments 12a–12f are helically wound on the core and advanced downstream and are next brought to the winding station 114. At the winding station 114, a second set of filaments 12g–12l are similarly applied on the same helical surfaces of the core and, therefore, are applied over the initial set of filaments 12a–12f. With two filaments in each stack, a third set of filaments are applied at the third winding station 116 at which filaments 12m–12r are applied as a third layer of filaments in each of the six stacks. The process is again duplicated at the winding stations 118 and 120 to provide a total of six stacks of ribbons, each containing five filaments.

Figure 19:
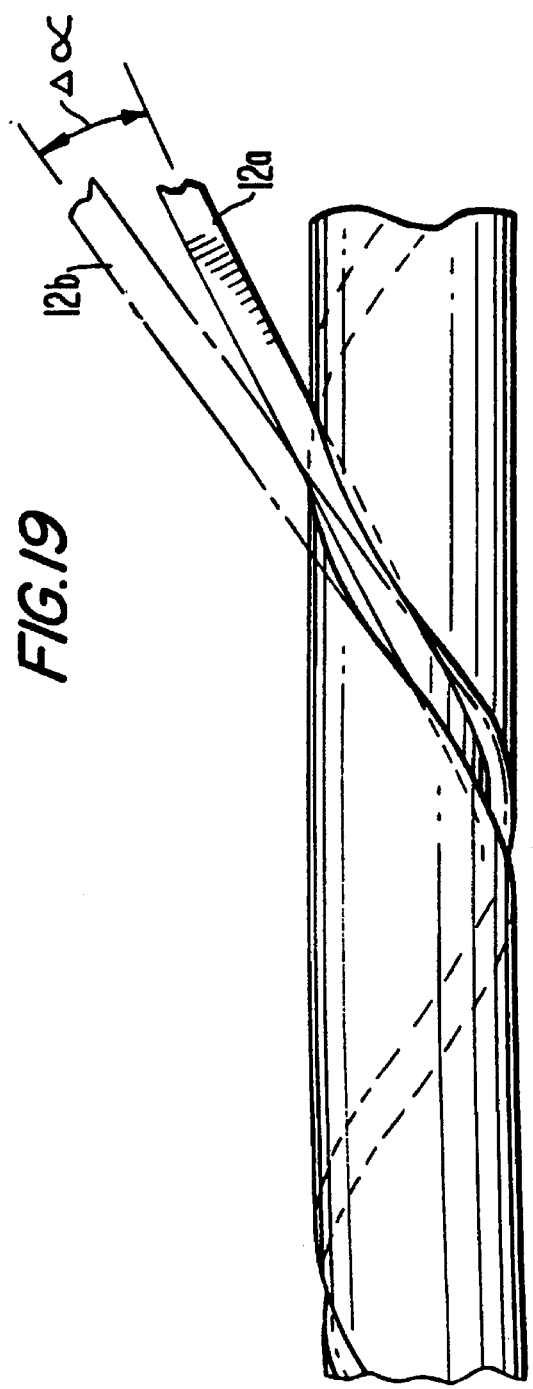
FIG. 19 is an enlarged view of a section of the core shown in FIG. 17, illustrating differences in application angles of the filaments or ribbons to compensate for the differences in the diameters of the helical surfaces on which the ribbons are applied at the different winding stations, in accordance with the principle illustrated in FIG. 18.

It will be appreciated, however, that at each successive winding station, the filaments are applied on increasingly larger diameter helical surfaces. This is due to the application of additional filaments pairs or sets at each upstream winding station. Thus, the filaments 12a–12f are applied to the helical surface of the core itself while successively downstream winding stations apply the ribbons on the previously deposited layers of ribbons so that the ribbons 12z–12ff are applied to the largest diameter core-plus-ribbon configuration. Referring to FIG. 18, however, the larger the diameter at which the filaments are applied, the steeper the feed angle that the ribbons must be applied in order to maintain a predetermined or fixed lay length L. Thus, by way of illustration only, a first ribbon 12a applied to a core diameter D1 can be applied at a feed angle $\alpha$ in order to circumvent the core in a lay length L. However, if the thickness of the ribbon or filament 12a is such that the second ribbon or filament 12b must be wound on top of the ribbon 12a, the lay angle must be increased to $\beta$ in order to complete the lay cycle within the same lay length L. In view of this, in accordance with the present embodiment, the feed directions F1–F5 as shown in FIG. 17 are advantageously selected to be different at the different winding stations to compensate for the different diameters of the helical surfaces at different winding stations to which the ribbons are applied to thereby maintain a desired lay length substantially independently of the position of the winding station or the diameter of the core on which the filaments are applied. This is further exemplified in FIG. 19 in which the difference in the lay angles $\Delta\alpha$ in FIG. 18 is shown in FIG. 19. In the arrangement shown in FIG. 17, it will be clear that the angles between the feed directions F1–F5 will successively increase for filaments applied at winding stations located at successively more downstream positions along the machine axis.

The present invention also contemplates the method of helically winding a plurality of flat filaments or ribbons about a cylindrical core. The method involves supplying a rotating central core having a cylindrical surface (whether slotted or smooth) for longitudinal movement substantially along a machine axis of an apparatus. A plurality of flat filaments are supplied which are helically wound about the cylindrical surface of the core. At least one winding station is provided downstream of the first supply means and arranged substantially along the machine axis. Each of a plurality of filaments is then guided along a feed direction that defines an acute angle with the machine axis which substantially corresponds to a desired lay angle of the filaments about the core. Each of the filaments are drawn along the feed direction by the rotating core for substantial tangential application of the filaments about the core at the winding station. The guide means is arranged to substantially prevent contact of incoming flat filaments until they are laid on the rotating core.

Although preferred embodiments of the present invention have been described and illustrated, it will be apparent to those skilled in the art that various modifications may be made without departing from the principals of the invention. Thus, while the apparatus and method are useful in the manufacture of optical cables, the invention can also be used to manufacture any elongate structures formed by helical application of flat ribbons, strips or filaments. One application for which the invention is suited, for example, is the manufacture of high pressure flexible composite pipe. Such pipe typically includes an inner tubular liner on which right and left hand reinforcing layers in the form of elongate strip are successively applied with the same or different lay angles. The entire assembly is then enclosed within an outer cover. Such composite pipes may, therefore, be formed by successive applications of the method in which successive layers are applied at desired lay angles.

I claim:

1. Apparatus for helically winding a plurality of flat filaments about a cylindrical core comprising first supply means for supplying a rotating central core having a cylindrical surface for longitudinal movement substantially along a machine axis of the apparatus; second supply means substantially fixed relative to the direction of said machine axis for supplying a plurality of flat filaments to be helically wound about the cylindrical surface of the core; at least one winding station downstream of said first supply means and arranged substantially along said machine axis; and guide means for guiding each of a plurality of filaments along a feed direction that defines an acute angle with said machine axis which substantially corresponds to a desired lay angle of the filaments about the core, each of said filaments being drawn along said feed direction by the rotating core for substantially tangential application of the filaments about the core at said winding station.

2. Apparatus as defined in claim 1, further comprising support means having a downstream end arranged substantially along said machine axis and an upstream end offset from said machine axis to define an angle between said support means and said machine axis which is substantially equal to the desired lay angle of the filaments about the core for supporting and guiding said filaments between said upstream and downstream ends, said guide means guiding the filaments from said second supply means to said upstream end of said support means and for positioning the filaments in a predetermined number of adjacent positions along a direction substantially transverse to said support means to form a predetermined number of filament units no greater than the number of helical windings to be applied about the core, said filament units being drawn along said support means by the rotating core for staggered and tangential application of the filament units about the core at said winding station at said downstream end of said support means.

3. Apparatus as defined in claim 2, further comprising sensor means for sensing the individual tensions in each of the filaments; and tension compensating means for controlling tensions in the filaments based on information provided by said sensor means, whereby said filaments are wound on the core when said filaments are moved substantially linearly along said support means with controlled tensions therein.

4. Apparatus as defined in claim 2, wherein said support means comprises a substantially flat elongate table having a top surface, on which the filaments are deposited, which is in a substantially horizontal plane.

5. Apparatus as defined in claim 2, further comprising a linear die substantially coextensive with said support means at the point of application of the filament units about the core and positioned proximate to at least a portion of the core on the same side as said support means relative to said machine axis to support the core and counteract the lateral components of the winding tensions in a direction perpendicular to the longitudinal axis of the core.

6. Apparatus as defined in claim 2, wherein said support means comprises a table, and further comprising retainer means along at least one edge of said table to retain filament units as they are moved between said upstream and downstream ends of said table.

7. Apparatus as defined in claim 2, wherein said support means comprises a table mounted for selective movements of said upstream end to opposite sides of said machine axis while maintaining said downstream end substantially at said winding station, whereby lay angles can be modified and winding senses reversed.

8. Apparatus as defined in claim 7, wherein said downstream end of said table is pivotally mounted.

9. Apparatus as defined in claim 3, further comprising third supply means for supplying a plurality of elongate separators for separating adjacent units of filaments.

10. Apparatus as defined in claim 1, wherein said second supply means comprises spools of fiber optic strands or ribbons.

11. Apparatus as defined in claim 3, wherein said guide means includes final sheaves one for each of the filaments which are arranged to dispense respective filaments substantially coextensively and along said downstream direction of said support means.

12. Apparatus as defined in claim 11, wherein said sensor means comprises sensors coupled to said final sheaves for monitoring the tensions of the filaments at said final sheaves.

13. Apparatus as defined in claim 9, wherein said guide means includes final sheaves one for each of the separators which are arranged to dispense respective separators substantially coextensively and along the downstream direction of support means.

14. Apparatus as defined in claim 13, wherein said sensor means comprises sensors coupled to said final sheaves for monitoring the tensions in the separators at said final sheaves.

15. Apparatus as defined in claim 9, wherein said guide means comprises a separator deflection station at said upstream end of said support means for deflecting the directions of the separators and dispensing the separators substantially coextensively and along the downstream direction of said support means.

16. Apparatus as defined in claim 15, wherein said separator deflection station comprises m final deflection sheaves for dispensing m separators along the downstream direction of said support means corresponding to said predetermined number of filament units to be wound about the core.

17. Apparatus as defined in claim 2, wherein said guide means comprises at least one filament deflection station at said upstream end of said support means for deflecting the directions of the filaments and dispensing the filaments substantially coextensively and along the downstream direction of said support means.

18. Apparatus as defined in claim 17, wherein said filament deflection station comprises m final deflection sheaves for dispensing m filaments along the downstream direction of said support means corresponding to said predetermined number of filament units to be wound about the core.

19. Apparatus as defined in claim 18, wherein a plurality of filament deflection stations are provided serially arranged along the longitudinal direction of said support means.

20. Apparatus as defined in claim 17, wherein said guide means comprises a separator deflection station upstream of said filament deflection station.

21. Apparatus as defined in claim 20, wherein each filament deflection station dispenses one filament for each filament unit position along said table transverse direction, n filament deflection stations being serially arranged along said support means to provide bundles of n stacked filaments of each of said m filament unit positions.

22. Apparatus as defined in claim 2, wherein said support means comprises a substantially flat elongate table.

23. Apparatus as defined in claim 3, wherein said sensor means is provided at points proximate to said upstream end of said support means, whereby said filaments can be moved along said support means with controlled tension therein substantially independently of forces acting on the filaments upstream of said support means.

24. Apparatus as defined in claim 3, wherein said tension compensating means is responsive to said sensor means.

25. Apparatus as defined in claim 3, wherein said tension compensating means is manually adjustable in response to indications of said sensor means.

26. Apparatus as defined in claim 2, further comprising units at least in a region proximate to said winding station to thereby insure the integrity of the filament units as they are applied about the core.

27. Apparatus as defined in claim 26, wherein said support means comprises said positioning means.

28. Apparatus as defined in claim 26, wherein said positioning means includes longitudinal ribs which extend along said support means spaced from each other to create channels for maintaining the orientations and positions of the filaments.

29. Apparatus as defined in claim 26, wherein said support means comprises a plurality of positioning dies for orienting and positioning the filaments in each group of filaments forming a filament unit in desired positions relative to each other.

30. Apparatus as defined in claim 26, wherein the core has a plurality of helical grooves, and said positioning means comprises insertion tools used to force each filament unit to have proper orientation upon insertion into a groove until the filaments are constrained by the walls of the grooves.

31. Apparatus as defined in claim 2, for helically winding a plurality of filaments about a cylindrical core having a plurality of helical grooves, further comprising insertion means in a region proximate to said winding station for depositing each filament unit within a helical groove while insuring proper orientation of the filaments within the filament units.

32. Apparatus as defined in claim 1, wherein said guide means comprises a set of guide members arranged for converging a plurality of filaments into a stacked unit of filaments for substantially tangential application to the cylindrical surface of the central core at a surface application point which defines a radial direction which extends from said machine axis through said application point, said guide members arranging said plurality of filaments in a feed plane which is defined by and contains said feed and radial directions, said plurality of filaments converging from said guide members to said winding station to cause initial contact between adjacent filaments substantially at the point of application of the filaments on the core to form a stack of filaments, adjacent filaments forming each stack being angularly offset from each other within said feed plane prior to contact; and insertion means at said point of application for closing the filaments into a stack and applying same to the rotating core substantially at said application point, whereby incoming flat filaments are substantially prevented from contacting each other until they are laid on the advancing core.

33. Apparatus as defined in claim 32, wherein the angular offsets between adjacent filaments forming a stack are substantially equal.

34. Apparatus as defined in claim 32, wherein a plurality of winding stations are sequentially arranged along said machine axis, a set of guide members and insertion means being provided for each winding station for application of a stack of filaments at one of a plurality of successive application points along the core.

35. Apparatus as defined in claim 34, wherein each winding station arranges a plurality of filaments in a feed plane prior to application on the core, and wherein all said feed planes are substantially co-extensive in a common feed plane.

36. Apparatus as defined in claim 35, wherein said guide members for said plurality of winding stations are arranged to angularly offset all adjacent filaments in said common feed plane relative to each other to cause said filaments to generally converge from said guide members to said insertion means.

37. Apparatus as defined in claim 32, wherein the core is provided with a plurality of helical grooves in the cylindrical surface, and said insertion means comprises an insertion tool provided for each helical groove, each insertion tool including an upper portion fixedly mounted in relation to the core when filaments are being fed and applied to the core, a lower portion receivable within the groove, and an opening between said upper and lower portions for receiving and closing a plurality of filaments to be laid into the groove to bring the filaments into contact with each other just prior to being placed into the groove.

38. Apparatus as defined in claim 37, wherein opening is arranged radially proximate to the cylindrical surface of the core to thereby allow adjacent filaments forming a stack to contact only just prior to being placed into a groove.

39. Apparatus as defined in claim 37, wherein the grooves in the core have a predetermined width, and said lower portion has a width substantially equal to said predetermined width to be received within the groove with little clearance, whereby the placement of a stack of filaments centrally within the groove is assured.

40. Apparatus as defined in claim 1, wherein said guide means comprises a plurality of sets of guide members, each set being arranged for guiding a plurality of filaments onto a corresponding plurality of helical core surfaces axially spaced from each other along the longitudinal length direction of the core, the helical surfaces of the core associated with each set of guide members defining a winding station, successive sets of guide members applying a like plurality of filaments on previously laid filaments to thereby form a stack of filaments on each helical core surface which has a number of filaments in each stack which corresponds to the number of axially spaced winding stations, whereby incoming flat filaments are substantially prevented from contacting each other until they are laid on the advancing core.

41. Apparatus as defined in claim 1, wherein said feed directions of said filaments is different at different winding stations to compensate for different diameters of said helical core surfaces at different winding stations to thereby maintain a desired lay length substantially independently of the position of said winding station and the diameter of the core on which the filaments are applied.

42. Apparatus as defined in claim 41, wherein the angles between said feed directions and said machine axis successively increase for filaments applied at winding stations located at a successively more downstream positions along said machine axis.

43. Method of helically winding a plurality of flat filaments about a cylindrical core comprising the steps of supplying a rotating central core having a cylindrical surface for longitudinal movement substantially along a machine axis of the apparatus; supplying a plurality of flat filaments to be helically wound about the cylindrical surface of the core; providing at least one winding station downstream of said first supply means and arranged substantially along said machine axis; and guiding each of a plurality of filaments along a feed direction that defines an acute angle with said machine axis which substantially corresponds to a desired lay angle of the filaments about the core, each of said filaments being drawn along said feed direction by the rotating core for substantially tangential application of the filaments about the core at a winding station.

44. Method as defined in claim 43, further comprising the step of preventing contact of incoming flat filaments substantially until they are laid on the advancing and rotating core.

* * * * *